No. 868,136. PATENTED OCT. 15, 1907.
J. W. SHIELDS.
PACKING.
APPLICATION FILED MAR. 12, 1907.

Witnesses

Inventor
James W. Shields
By R. A. W. Lacey,
Attorneys

UNITED STATES PATENT OFFICE.

JAMES W. SHIELDS, OF HUBBELL, MICHIGAN.

PACKING.

No. 868,136.  Specification of Letters Patent.  Patented Oct. 15, 1907.

Application filed March 12, 1907. Serial No. 362,030.

*To all whom it may concern:*

Be it known that I, JAMES W. SHIELDS, a citizen of the United States, residing at Hubbell, in the county of Houghton and State of Michigan, have invented certain new and useful Improvements in Packings, of which the following is a specification.

This invention provides packing for engine and pumping machinery being especially adapted for pistons operating in cylinders which are closed at their ends and have the piston rod arranged to work through an opening or stuffing box in a head of the cylinder, the packing being yieldable to automatically compensate for any disalinement of the piston rod.

In accordance with this invention, the packing embodies a yieldable or elastic core and an enveloping portion of either textile or fibrous material, or a combination of fibrous material and metallic strands so interwoven as to provide a substantial and durable article which will resist both wear and compressive or expansive stress.

For a full description of the invention and the merits thereof and also to acquire a knowledge of the details of construction and the means for effecting the result, reference is to be had to the following description and accompanying drawings.

Figure 1:
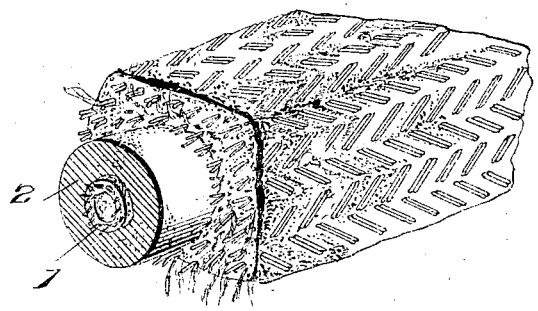
Figure 2:
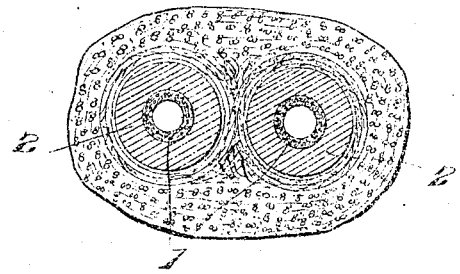

While the invention may be adapted to different forms and conditions by changes in the structure and minor details without departing from the spirit or essential features thereof, still the preferred embodiment is shown in the accompanying drawings, in which:

Figure 1 is a perspective view of a packing embodying a single yieldable or elastic core. Fig. 2 is a perspective view of a modified form of packing embodying a plurality of yieldable or elastic cores.

The essential features of the invention as hereinbefore stated is the yieldable or elastic core. This core 1 is usually formed of rubber although it may be constructed of any material possessing elastic qualities so as to maintain the normal shape of the packing in cross section, whereby when the packing is relieved of compressive force, the elastic core regaining itself, will cause the packing to assume its original form or shape. The core 1 is hollow, thereby further adding to its elasticity. The material 2 enveloping the core 1 may be fibrous and composed either of textile or mineral wool or a combination of fibrous and metallic strands interwoven to produce a substantial and wear resisting packing which will sustain heavy stress. The packing may have any cross sectional outline and this is true of the core.

In the construction shown in Fig. 2, the packing embodies a series or plurality of cores, otherwise it is of substantially the same construction as hereinbefore specified. The plural cores have a parallel arrangement and are preferably separated by fibrous material. This form of packing is more elastic than that disclosed in Fig. 1 and is preferred in some types of engines or pumps particularly where the piston rod is liable to have any appreciable play from an axial line.

Having thus described the invention, what is claimed as new is:

1. A packing comprising an elastic core, and a body portion enveloping the core and consisting of interwoven fibrous and metallic strands.

2. A packing comprising a tubular elastic core, and a body portion enveloping the core and consisting of interwoven fibrous and metallic strands.

3. A packing comprising a plurality of tubular elastic cores arranged in parallel relation to each other, and a body portion enveloping the cores and consisting of interwoven fibrous and metallic strands.

In testimony whereof I affix my signature in presence of two witnesses.

JAMES W. SHIELDS. [L. S.]

Witnesses:
 CHARLES D. HANCHETTE,
 FREDERICK M. PENNISTON.